United States Patent
Ognjanovski et al.

(10) Patent No.: US 10,348,038 B2
(45) Date of Patent: Jul. 9, 2019

(54) SOFT LOCK TO SECURE AN EVSE-TO-EV CHARGING CONNECTOR

(71) Applicant: Ford Global Technologies, LLC, Dearborn, MI (US)

(72) Inventors: Gregory Dean Ognjanovski, Shelby Township, MI (US); Robert Ognjanovski, Jr., West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 15/656,550

(22) Filed: Jul. 21, 2017

(65) Prior Publication Data

US 2019/0027867 A1    Jan. 24, 2019

(51) Int. Cl.
| H01R 13/639 | (2006.01) |
| H01R 13/66 | (2006.01) |
| B60L 53/16 | (2019.01) |
| H02J 7/00 | (2006.01) |

(52) U.S. Cl.
CPC .......... *H01R 13/6397* (2013.01); *B60L 53/16* (2019.02); *H01R 13/6683* (2013.01); *H01R 13/6691* (2013.01); *H02J 7/0045* (2013.01); *B60L 2270/30* (2013.01); *H01R 2201/26* (2013.01); *H02J 2007/0001* (2013.01)

(58) Field of Classification Search
CPC ............ H01R 13/6397; H01R 13/6691; H01R 13/6683; H01R 2201/26; H02J 7/0045; H02J 2007/0001; B60L 11/1818; B60L 2270/30

USPC ......................................................... 320/109
See application file for complete search history.

(56) References Cited

U.S. PATENT DOCUMENTS

| 8,006,099 | B2 | 8/2011 | Aoyama et al. |
| 8,016,604 | B2 | 9/2011 | Matsumoto et al. |
| 8,075,329 | B1 | 12/2011 | Janarthanam et al. |
| 8,550,833 | B2 | 10/2013 | Martin |
| 8,558,504 | B2 * | 10/2013 | Brown ................... B60L 3/0069 320/109 |
| 8,932,072 | B2 | 1/2015 | Tamaki et al. |
| 9,283,931 | B2 * | 3/2016 | Skelton ................... B60R 25/00 |
| 9,352,652 | B2 | 5/2016 | Montemayor Cavazos et al. |
| 9,725,005 | B2 * | 8/2017 | Geber ................. B60L 11/1818 |
| 2006/0056663 | A1 | 3/2006 | Call |
| 2009/0207129 | A1 | 8/2009 | Ullrich et al. |
| 2011/0193680 | A1 | 8/2011 | Summerford et al. |
| 2012/0217928 | A1 | 8/2012 | Kulidjian et al. |
| 2012/0268247 | A1 | 10/2012 | Boot et al. |
| 2013/0337669 | A1 | 12/2013 | Najera et al. |
| 2017/0018129 | A1 | 1/2017 | Huebner |

* cited by examiner

*Primary Examiner* — M Baye Diao
(74) *Attorney, Agent, or Firm* — David B. Kelley; Brooks Kushman P.C.

(57) ABSTRACT

A connector to a soft lock receptacle includes a controller and a memory electrically coupled to the controller. During a user coupling the connector to the receptacle, the controller generates and stores a stored record in the memory. During the user attempting uncoupling the connector, the controller generates a re-obtained record. Responsive to the re-obtained record matching the stored record, the controller unlocks the connector.

17 Claims, 4 Drawing Sheets

US 10,348,038 B2

SOFT LOCK TO SECURE AN EVSE-TO-EV CHARGING CONNECTOR

TECHNICAL FIELD

This disclosure relates to recharging electric vehicles (EVs) while stationary using a detachable charging connector and cable arrangement, and more particularly to a system and method for preventing unauthorized disengagement of the charging connector from a charging port on the EV.

BACKGROUND

An electric vehicle (EV) whether implemented as a battery electric vehicle (BEV) or plug-in hybrid electric vehicle (PHEV) includes a high-voltage storage electrical energy storage device such as a battery, ultracapacitor or other similar device. When the EV is operated, the electrical energy storage device becomes discharged and needs to be recharged. Recharging of the EV electrical energy storage device when the EV is stationary may be performed at home in the driveway, at a work parking area, at a commercial charging station, or the like using an electric vehicle supply equipment (EVSE) system during times when the EV owner or other authorized person may not have direct or immediate control of the EV.

An EVSE system generally includes an electrical power supply subsystem that is electrically connected (e.g., coupled) to a large-scale power grid and a computer controlled charger (e.g., electrical power source) electrically coupled to an electrically conducting cable (i.e., conductor, wiring, etc.) terminated by a connector (i.e., plug, jack, etc.). The connector is detachably coupled (e.g., connected, plugged into, hooked up, inserted into, joined with, mated to, and the like) to a receptacle (e.g., port, charge port, input, jack, fitting, etc.) on the EV such that the EV electrical energy storage device can be recharged from the electrical power source. The electrical cable may include electrical conductors to provide two-way electrical communication between the charger controller, the connector, and the EV. Additionally, or alternatively, some or all communication between the charger controller, the connector, and the EV may be implemented wirelessly via devices such as key fobs, cell phones, smart phones, and the like.

There is, of course, a cost associated with furnishing the electricity; hence, there is a desire to prevent unauthorized use of the EVSE. EVSE systems and EVs can include a latching apparatus that provides for locking the EVSE connector into the EV receptacle with unlatching to be performed only by an authorized person. Thus, before the EVSE controller will permit actions such as connecting the EVSE connector to the EV receptacle, locking the EVSE connector to the EV receptacle, turning on the electrical power in the EVSE conductor and connector, unlocking the EVSE connector from the EV receptacle, and, thereby, allowing the EVSE connector to become disengaged (e.g., disconnected, uncoupled, pulled out, unhooked, etc.) from the EV receptacle, some form of authorization is sometimes implemented at one or more steps of the charging process. However, conventional techniques at preventing unauthorized disconnection of the EVSE connector from the authorized user's EV such as using a physical key actuated mechanical lock, an electronic key fob signal, and the like can be inconvenient or bothersome to the authorized user.

SUMMARY

A method of soft locking a connector to a receptacle on an electric vehicle (EV) includes, during coupling of the connector to the receptacle by a user, the receptacle electrically coupling to a controller, and the controller obtaining a biometric record from the user, storing the biometric record in memory as a stored biometric record, and locking the connector into the receptacle. The method further includes, responsive to the user attempting to uncouple the connector, the controller generating a re-obtained biometric record, responsive to the re-obtained biometric record matching the stored biometric record, the controller unlocking the connector, and responsive to the re-obtained biometric record not matching the stored biometric record, the connector remaining locked.

A connector to a soft lock receptacle includes a controller and a memory electrically coupled to the controller. During a user coupling the connector to the receptacle, the controller generates and stores a stored record in the memory. During the user attempting uncoupling the connector, the controller generates a re-obtained record. And responsive to the re-obtained record matching the stored record, the controller unlocks the connector.

A soft lock system for securing a charging connector to an electric vehicle (EV) includes a charging station including a controller electrically coupled to a memory, and programmed to control the system responsive to programming stored in the memory and information received from a user, a cable electrically coupled to the controller and terminated with the connector, and a receptacle on the EV. The connector is configured to matingly couple and lock to the receptacle. During user coupling, the connector to the receptacle is electrically coupled to the controller, the controller obtains a biometric record from the user and stores the biometric record in the memory as a stored biometric record, and locks the connector into the receptacle. Responsive to the user attempting uncoupling the connector, the controller generates a re-obtained biometric record. Responsive to the re-obtained biometric record matching the stored biometric record, the controller unlocks the connector. And responsive to the re-obtained biometric record not matching the stored biometric record, the connector remains locked.

DETAILED DESCRIPTION

Figure 1:
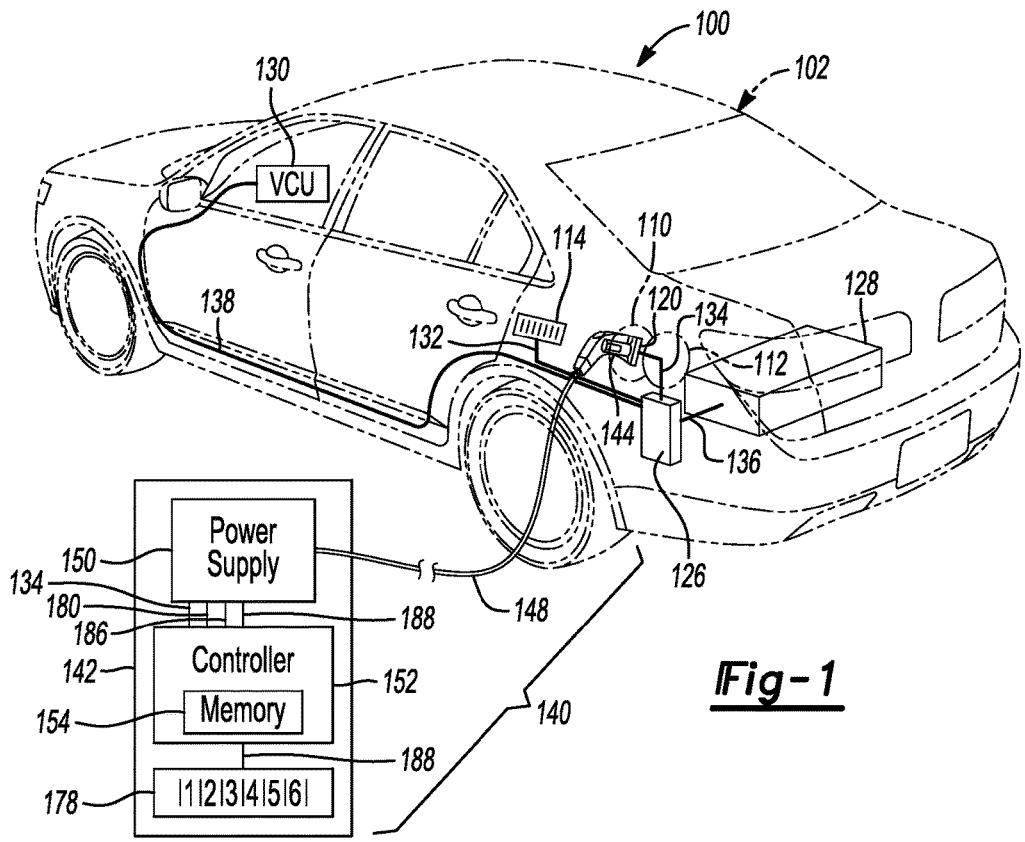
FIG. 1 is a schematic diagram left, rear, upper isometric view illustrating an electric vehicle charging system including an electric vehicle with a charge port, and electric power supply subsystem having cable with an electrical plug that connects to the electric vehicle in accordance with one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure is directed to system and method embodiments of a soft lock to secure a charging connector on an electric vehicle supply equipment (EVSE) subsystem to a receptacle on an electric vehicle (EV). As detailed below and shown on the Figures, the embodiments generally provide improved technical effects that relate to securing the charging connector on the EVSE subsystem to the receptacle on the EV by reducing or preventing unauthorized disengagement of the connector from the receptacle.

Elements of the system and subsystems embodiments of the disclosure may include, but are not necessarily included in all embodiments, and are not limited to:
100: a soft lock system to secure an EVSE charging connector to an EV;
102: an electric vehicle (EV) having an outer surface (e.g., exterior) and an interior defined therein;
104: unused;
106: unused;
108: unused;
110: a body panel opening on the exterior of the EV 102;
112: a panel door on the exterior of the EV 102;
114: a first (or EV body) touch/key pad device (i.e., first I/O device);
116: unused;
118: unused;
120: a charge (or charging) receptacle (i.e., port, socket, etc.);
122: unused;
124: unused;
126: a charge input module;
128: an electrical energy storage device (e.g., battery, ultracapacitor, etc.);
130: a vehicle control unit (VCU);
132: a first (or first I/O device-to-charge input module) electrical interconnect cable (e.g., cord, wiring, and the like) (i.e., first cable);
134: a second (or receptacle-to-charge input module) electrical interconnect cable (i.e., second cable);
136: a third (or energy storage device-to-charge input module) electrical interconnect cable (i.e., third cable);
138: a fourth (or VCU-to-charge input module) electrical interconnect cable (i.e., fourth cable);
140: electric vehicle supply equipment (EVSE) (e.g., an electric power supply) subsystem;
142: a charging station;
144: an electric charging connector (e.g., plug);
148: a fifth (or charging connector-to-charging station) electrical interconnect cable (i.e., fifth cable or charging cable);
150: an electrical power supply;
152: a controller;
154: a computer memory;
156: unused;
158: unused;
160: a housing (of the connector 144);
162: a handle region (of the connector 144);
164: a nose section (of the connector 144);
166: a latch arm (of the connector 144);
168: a release bar (e.g., trigger, lever, and the like) (of the connector 144);
170: unused;
172: unused;
174: a finger/thumb key/biometric sensor (reader) input/haptic feedback output device (i.e., second I/O device);
176: a visual display/indicator (i.e., third I/O device);
178: a second (or charging connector) key/touch pad device (i.e., fourth I/O device);
180: a sixth (or second I/O device-to-charging station) electrical interconnect cable (i.e., sixth cable);
182: unused;
184: unused;
186: a seventh (or third I/O device-to-charging station) electrical interconnect cable (i.e., seventh cable); and
188: an eighth (or fourth I/O device-to-charging station) electrical interconnect cable (i.e., eighth cable);
189-299: unused.

Elements of the method (e.g., process, steps, routine, etc.) embodiments of the disclosure may include but are not necessarily included in all embodiments and are not limited to:
300: a soft lock method of securing an EVSE charging connector to an EV;
310: step—INSERT CONNECTOR IN EV RECEPTACLE;
320: step—OBTAIN AND STORE BIOMETRIC RECORD, PRESENT POSITIVE VISUAL/HAPTIC FEEDBACK;
330: step—RE-OBTAIN BIOMETRIC RECORD AND COMPARE TO STORED BIOMETRIC RECORD;
340: step—MATCHING, PRESENT POSITIVE VISUAL DISPLAY/HAPTIC FEEDBACK, CONNECTOR UNLOCKED AND CAN BE REMOVED FROM EV;
350: step—NOT MATCHING, LOCKOUT, PRESENT NEGATIVE FEEDBACK, CONNECTOR REMAINS LOCKED, REQUEST RE-OBTAIN BIOMETRIC RECORD UP TO X TIMES;
360: step—IN RESPONSE TO X NOT-MATCHING TRIES, PRESENT NEGATIVE FEEDBACK, REQUEST CODE ENTRY;
370: step—RECEIVE ENTERED CODE AND COMPARE TO PRE-STORED CODE;
372: step—MATCHING, OVERRIDE LOCKOUT, TRANSITION TO STEP 340;
374: step—NOT MATCHING, PRESENT NEGATIVE FEEDBACK, LOCKOUT REMAINS, REQUEST CODE ENTRY UP TO X TIMES;
376: step—IN RESPONSE TO X NOT MATCHING TRIES, PRESENT NEGATIVE FEEDBACK, REQUEST ALTERNATIVE LOCKOUT OVERRIDE;
378: step—RECEIVE VALID ALTERNATIVE LOCKOUT OVERRIDE, TRANSITION TO STEP 372.

A user (e.g., driver, operator, owner, lessee, chauffer, etc.), generally operates the soft lock system 100 using the soft lock method 300. The user is generally an authorized person having biometric characteristics (e.g., at least one of thumbprint, fingerprint, palmprint, retinal image, facial image, voice, voice and code words, etc.) and knowledge of one or more unique alpha and/or numeric character code(s) that have been previously approved for recognition and operation of the system 100. Entry, approval, authentication, storage, retrieval, and the like of such biometric characteristics and unique access codes in a system such as the system 100 as described herein and shown on the Figures is understood by one skilled in the art.

Further, as is understood by one skilled in the art, a soft lock is a lock having the capability to unlock a device without the use of physical hardware such as a mechanical key and lock apparatus. A soft lock mechanism may include but is not limited to a biometric sensor/scanner/reader/input and/or output (I/O) device (e.g., a thumbprint/fingerprint/palmprint scanner, a facial recognition scanner, a retinal image scanner, a voice recognition and code words sensor, and the like); a push button or touch keypad to input a unique (e.g., 3, 4, 5, or 6 digit/character) access code; feedback devices such as visual displays and haptic devices; and the like implemented with operation and control processes implemented using an appropriate controller (e.g., the controller 152). As used throughout herein, the term I/O device applies to devices that may be implemented to perform input, output, or both input and output functions, and such uses would be understood by one of skill in the art in view of the context of implementation and configuration as described. Further, when the visual displays and haptic devices provide feedback to the user, such feedback is generally presented for a limited time interval, e.g., two to ten seconds; however, such feedback may be presented for shorter or longer intervals as would be understood by one of skill in the art in view of the context of implementation and configuration as described.

With respect to issued patents and published patent applications, if any, that are incorporated by reference herein; one of skill in the art would understand that such references are only incorporated to the extent that they are exemplary of the types of technologies that may be implemented as referenced, and are not intended as limitations to or as mandatory to the embodiments of the disclosure.

Referring to FIG. 1, a schematic diagram illustrating the soft lock system 100, the electric vehicle (EV) 102 (illustrated in phantom for clarity of illustration of other components), and the electric vehicle supply equipment (EVSE) subsystem 140 in accordance with one or more embodiments is shown. FIG. 1 illustrates examples of components, their associations, and positions. As one of skill in the art would understand, alternative components, associations, positions, and features may be implemented within the scope of the embodiments of the disclosure.

The electric vehicle (EV) 102 may be implemented as a battery electric vehicle (BEV) or a plug-in hybrid electric vehicle (PHEV). The exterior of the EV 102 comprises the body panel opening 110 and the panel door 112. The panel door 112 is generally implemented to close the body panel opening 110 (the closed position of the door panel is not shown for clarity of illustration).

The EV 102 further comprises the touch/key pad (first I/O) device 114, the charge receptacle 120, the charge input module 126, the electrical storage device (battery) 128, the vehicle control unit (VCU) 130, the first electrical interconnect cable (first cable) 132, the second electrical interconnect cable (second cable) 134, the third electrical interconnect cable (third cable) 136, and the fourth electrical interconnect cable (fourth cable) 138. While the electrical storage device 128 may be implemented as any appropriate electrical storage device or medium (e.g., one or more batteries, battery cells, battery packs, ultra capacitors, and the like) for convenience, the term battery 128 is generally used herein: however, such use is not a limitation of the energy storage device that may be implemented in the embodiments. Further, as would be understood by one of skill in the art, the battery 128 is generally electrically coupled (connected) to one or more electric motors to provide tractive propulsion to the EV 102, and other electrically powered apparatuses, which for clarity, are not illustrated.

The first I/O device 114 is generally accessible and operable by the user from outside of the EV 102. The first I/O device 114 may be implemented as a key pad having three to six entry keys (buttons). The first I/O device 114 is generally positioned (e.g., mounted, located, etc.) on the outer surface of the EV 102 proximate (i.e., near, adjacent, close to, within easy reach of, etc. as understood by one skilled in the art) the body panel opening 110 to provide the user easy (e.g., ready, unencumbered, direct, etc.) access to the touch/key pad device 114 during recharging process steps, in particular, the step 360 of the method 300 as discussed below in connection with FIG. 6. The first I/O device 114 is generally positioned at a distance less than 0.5 m., and more often less than 0.25 m. from the body panel opening 110. While the body panel opening 110, the panel door 112, and the first I/O device 114 are illustrated as placed in the left, rear area of the EV 102, the embodiments are not limited to placement only that location. In an embodiment, as discussed below with regard to FIG. 5, the first I/O device 114 may be placed on the EV 102 proximate to the receptacle 120.

The charge receptacle 120 is generally positioned (e.g., mounted, located, etc.) within the EV 102, interior to the body panel opening 110 (i.e., below the outer surface of the EV 102). The charge receptacle 120 is generally accessible by the user from outside of the EV 102 when the panel door 112 is in an open position. The first cable 132, the second cable 134, the third cable 136, and the fourth cable 138 which are generally placed interior to the outer surface of the EV 102. As discussed below with regard to FIG. 2, the receptacle 120 is sized and shaped to mechanically and electrically couple (e.g., mate, connect, etc.) with the plug 144.

The touch/key pad (first I/O) device 114 is in electrical communication with (i.e., electrically coupled to) the charge input module 126 via the first electrical interconnect cable (first cable) 132. The charge receptacle 120 is in electrical communication with (i.e., electrically coupled to) the charge input module 126 via the second electrical interconnect cable (second cable) 134. The charge input module 126 is also in electrical communication with the battery 128 via the third cable 136, and in electrical communication with the VCU 130 via the fourth electrical interconnect cable (fourth cable) 138. In alternative embodiments (not illustrated), the receptacle 120 may be directed electrically coupled to the battery 128. Electrical communication generally includes signal and power communication and transference and may include multiple instances of wiring within a cable (e.g., a wiring bundle with multiple branches).

The EVSE 140 comprises the electrical charging station 142, the electrical charging connector 144, and the fifth electrical interconnect cable (fifth or charging cable) 148. The electrical charging station 142 is in electrical communication with (i.e., electrically coupled to) the electrical charging connector 144 via the fifth cable 148. That is, the fifth cable 148 is terminated by the connector 144. As understood by one of skill in the art, the electrical charging station 142 is generally also in electrical communication with (i.e., electrically coupled to) an electrical power source such as an electrical power grid, solar cell array, wind power generator array, and the like, which for clarity, is not illustrated.

The charging station 142 comprises the power supply 150 and the controller 152 which includes (i.e., is generally directly electrically internally coupled to) the memory 154 via the second cable 134. The controller 152, in electrical connection the memory 154, is generally configured to control the operation of the soft lock secure system 100 via computer programming (e.g., executable instructions), and instructions from the user. The second cable 134 is electrically coupled between the power supply 150 and the controller 152 and the memory 154, and generally provides electrical communication between the charge input module 126 and the controller 152 and the memory 154.

In an embodiment, the charging station 142 may also comprise an implementation of the second key/touch pad (i.e., the fourth I/O device 178 and the eighth cable 188 (which are discussed below in more detail with regard to FIG. 2). The eighth cable 188 is generally electrically coupled between the fourth I/O device 178 and the controller 152. The key pad 114 and the key pad 178, regardless of where positioned, are generally configured to provide the user the ability to enter information into the system 100. Embodiments may include multiple location instances of the key pad 114 and the key pad 178 to provide convenient access to the user.

As is understood by one skilled in the art, the controller 152 (e.g., processor) as disclosed herein generally comprises one or more of a programmable (e.g., programmed) computer processing unit (i.e., CPU, microprocessor, etc.); the memory 154 that is read (retrieve) and write (store) capable, wherein the memory 154 may be of any physical manufacture including standalone memory devices, and may include sections where stored data, information, programming, records, files, and the like is non-transitory (persistent) and, alternatively, transitory (non-persistent); analog and digital input and output (i.e., interface, I/O, etc.) devices; firmware; logic circuitry; and software (i.e., program(s)). The electrical and electronic devices that comprise the controller 152 and the memory 154 are generally in electrical communication (e.g., electrically coupled via wiring or, alternatively, wirelessly) with each other and with peripheral devices and apparatuses (e.g., sensors, actuators, I/O devices, etc.) external to the processor. The controller 152 generally performs operations (e.g., methods, routines, steps, processes, control, and the like) in accordance with instructions provided in the program(s) (e.g., programming to control, executable instructions, and the like), and manually by the user. The operations performed by the controller 152 and associated apparatuses, assemblies, subassemblies, components, etc. may be shown and described by way of text, flow chart, graphical (e.g., figures, plots, etc.), tabular, etc. representation, and by any combination thereof. The controller 152 may be implemented as a standalone unit, or alternatively, as distributed subassemblies. The configuration of the controller 152 and associated devices is generally selected (chosen, procured, adapted, modified, etc.) as appropriate to the design criteria of a particular implementation, as would be readily comprehended by one of skill in the art.

As is understood by one of skill in the art, controller features of the charge input module 126 and the VCU 130 may be implemented similarly to the controller 152. The charge input module 126 may comprise additional components and features that provide voltage boost/buck, galvanic isolation, filtering, electrical communication, switching, buffering, etc. The VCU 130 may comprise additional components and features that provide control, monitoring, sensor input and actuator output processing, communication, and the like related to additional components, assemblies, subassemblies, and the like that are implemented in the EV 102.

Figure 2:
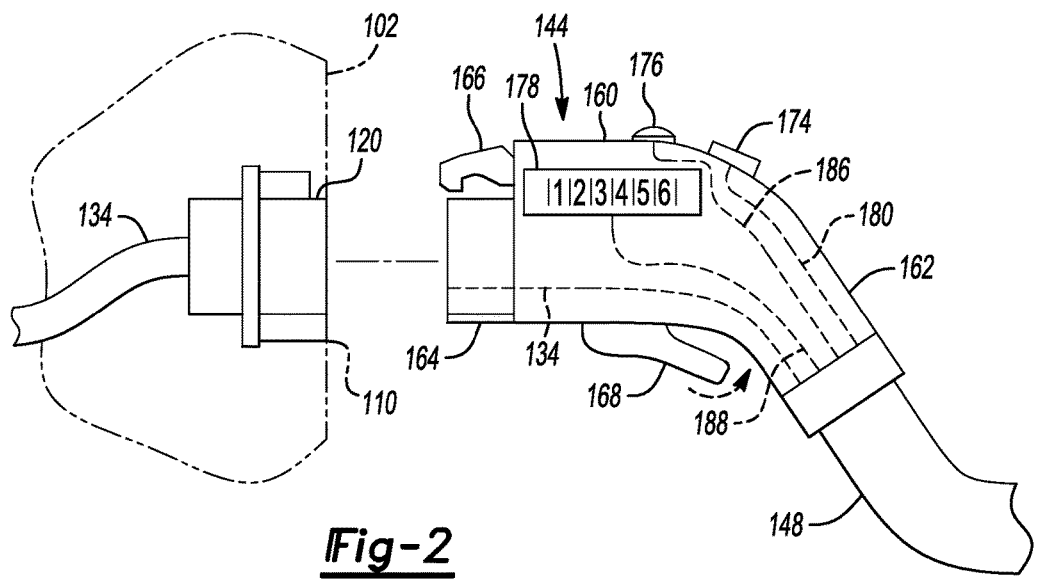
FIG. 2 is a schematic diagram illustrating a left side view of the charge port on the electric vehicle, and the left side of the electrical plug with the electrical plug having a latching mechanism at the terminal end and a biometric sensor and visual display on top, and a key pad on the side in accordance with one or more embodiments.

Referring to FIG. 2, a schematic diagram illustrating a left side view of the charge port 120 on the EV 102, and the left side of the electrical plug 144 in accordance with one or more embodiments is shown. The connector 144 generally comprises the housing 160, the second cable 134, the sixth cable 180, the seventh cable 186, the eighth cable 188, the latch arm 166, the release bar 168, the finger/thumb key/biometric sensor (reader) input/haptic feedback output (i.e., the second I/O) device 174, the visual display/indicator (i.e., the third I/O) device 176, and the second key/touch pad (i.e., the fourth I/O) device 178.

The housing 160 further comprises and is generally configured to mechanically define and position the handle region 162, the nose section 164; and mechanically hold and position the latch arm 166, the release bar 168, the finger/thumb key/biometric sensor (reader) input/haptic feedback output (i.e., the second I/O) device 174, the visual display/indicator (i.e., the third I/O) device 176, and the second key/touch pad (i.e., the fourth I/O) device 178. The housing 160 is also generally configured to house and protect the second cable 134, the sixth cable 180, the seventh cable 186, and the eighth cable 188. The rear of the housing 160 provides a mechanical interface between the connector 144 and the cable 148. The second cable 134, the sixth cable 180, the seventh cable 186, and the eighth cable 188 extend through the housing 160 and are electrically coupled to the charging station 142 (and thereby through to the controller 152) via the cable 148.

The handle section 162 of the housing 160 generally provides a region for the user to grasp and manipulate the plug 144. The nose section 164 includes connector terminals (not illustrated for clarity) and is sized and shaped to couple mechanically and electrically with the charge port 120 when the connector 144 is coupled in the receptacle 120 by the user. The latch arm 166 is sized and shaped to couple mechanically with the charge port 120 and lock the connector 144 to the receptacle 120. Some details of the mechanical and electrical coupling, and latching between the receptacle 120 and plug 144 may be implemented similarly to the EV connector to receptacle mechanism as shown and described, for example, in U.S. Pat. No. 8,075,329, issued Dec. 13, 2011, which is incorporated by reference in its entirety. Likewise, in another embodiment, some details of the mechanical and electrical coupling, and latching between the receptacle 120 and plug 144 may be implemented similarly to the EV connector to receptacle mechanism as shown and described, for example, in U.S. Pat. No. 8,932,072, issued Jan. 13, 2015, which is also incorporated by reference in its entirety. While illustrated as a hooked tang on the latch arm 166 that latches to the receptacle 120, in alternative embodiments (not illustrated), the latching mechanisms between the electrical charging connector 144 and the EV 102 may be implemented having any other physically secure lock mechanism controlled via the controller 152, as would be understood by one of ordinary skill in the art.

Figure 3:
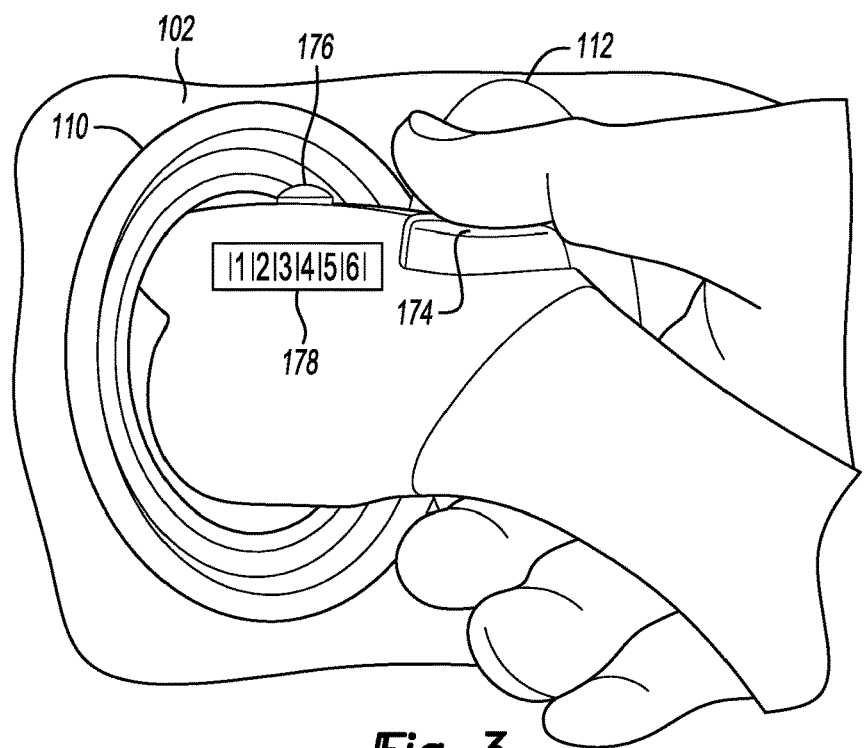
FIG. 3 is a schematic diagram illustrating an implementation of the electrical plug connected to the electrical vehicle where the electrical plug has a keypad on the left side and includes the biometric sensor and the visual display on the top in accordance with one or more embodiments.

The release bar (trigger) 168 is located at the bottom of the housing 160, forward of the handle region 162 to provide convenient access to the user for thumb or finger manipulation (see, also, FIG. 3). During appropriate conditions (discussed below in regard to FIG. 5, the method 300) squeezing the trigger 162 inward, as rotation shown in phantom, may unlatch the connector 144 from the receptacle 120 such that the connector 144 may be disengaged and removed from the receptacle 120.

The second I/O device 174 is positioned at the top of the housing 160 to provide convenient access to the user for thumb or finger manipulation (see, also, FIG. 3). An embodiment may include the second I/O device 174 implemented as a combination key pad, biometric sensor/reader, haptic feedback device. The second I/O device 174 may be implemented as a combination key/haptic feedback device as shown and described, for example, in U.S. Published Patent Application No. 2009/0207129, published Aug. 20, 2009, which is incorporated by reference in its entirety. The second I/O device 174 may be implemented as a key that includes a biometric sensor device as shown and described, for example, in U.S. Pat. No. 9,352,652, issued May 31, 2016, which is incorporated by reference in its entirety, and in particular, on FIG. 4 and at col. 6, line 61—col. 7, line 9. As would be understood by one of skill in the art, the second I/O device 174 may be implemented having any suitable biometric sensor/reader device.

The visual display/indicator (third I/O device) 176 also may be positioned at the top of the housing 160 to provide convenient viewing access to the user. The third I/O device 176 may be implemented as an LED, light bulb, light bar, glow panel, or any other appropriate visual indicator.

The second (or charging connector) key/touch pad device (i.e., fourth I/O device) 178 is generally positioned on the left side of the connector housing 160 to provide convenient finger manipulation access to the user. However, the fourth I/O device 178 may be positioned elsewhere, such as for example, the right side of the connector housing 160, or (as illustrated on FIG. 1), on the charging station 142. The fourth I/O device 178 may be implemented as a key pad having three to six entry keys (buttons). The key pad 114 and the key pad 178 are generally configured to provide the user the ability to enter information into the system 100 regardless of location.

The second cable 134 may provide for electrical communication between the charge input module 126 with the controller 152 via the electrical connection made when the plug 144 is mated into the receptacle 144.

The sixth cable 180 is generally electrically coupled between the second I/O device 174 and the controller 152 via the fifth cable 148. The seventh cable 186 is generally electrically coupled between the third I/O device 176 and the controller 152 via the fifth cable 148. The eighth cable 188 is generally electrically coupled between the fourth I/O device 178 and the controller 152 via the fifth cable 148.

As such, one of skill in the art would understand, while the controller 152 may be described as controlling the system 100 in response to programming and/or data stored in non-transitory sections of the memory 154, stored in transitory sections of the memory 154, and instructions received from the user, as the system 100 is an interconnected system, signals, data, information, instructions, and the like related to the operation and control of the system 100 may be shared and communicated between any of the controllers 126, 130, and 152 and the associated components via the interconnect cables 132, 134, 136, 138, 148, 180, 186, and 188, or, alternatively, wirelessly. Electrical communication for monitoring and control may be implemented, for example, by way of a controller area network (CAN) bus system as is understood by one of skill in the art.

Referring to FIG. 3, a schematic diagram illustrating an implementation of the electrical plug 144 connected to the EV 102 in the charge port 120, and as generally held by the user is shown. The electrical plug 144 includes the second keypad (e.g., the fourth I/O device) 178 on the left side, and also includes the biometric sensor (e.g., second I/O device) 174 and the visual display (e.g., third I/O device) 176 on the top in accordance with one or more embodiments.

Figure 4:
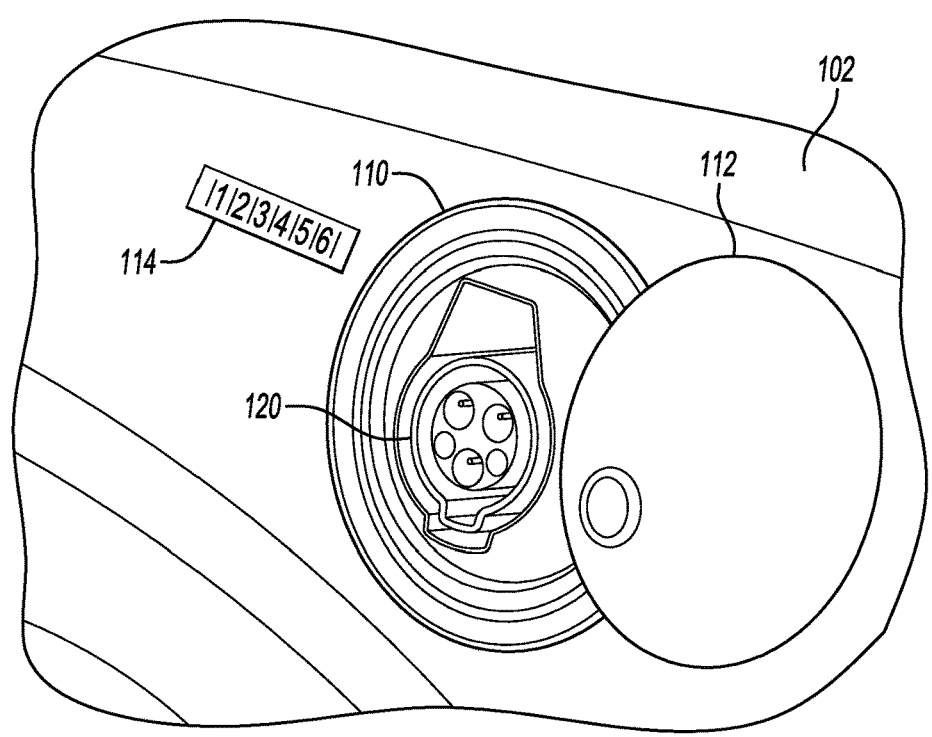
FIG. 4 is a schematic diagram illustrating implementation of a keypad on a vehicle panel in vicinity of the charge port in accordance with one or more embodiments.

Referring to FIG. 4, a schematic diagram illustrating implementation of the first I/O device (e.g., the first key pad) 114 is shown. The first I/O device 114 is illustrated mounted on the outer surface of the EV 102 in vicinity of the body panel opening 110 in accordance with one or more embodiments. The panel door 112 is in the open position and provides access through the body panel opening 110 to the receptacle 120.

Figure 5:
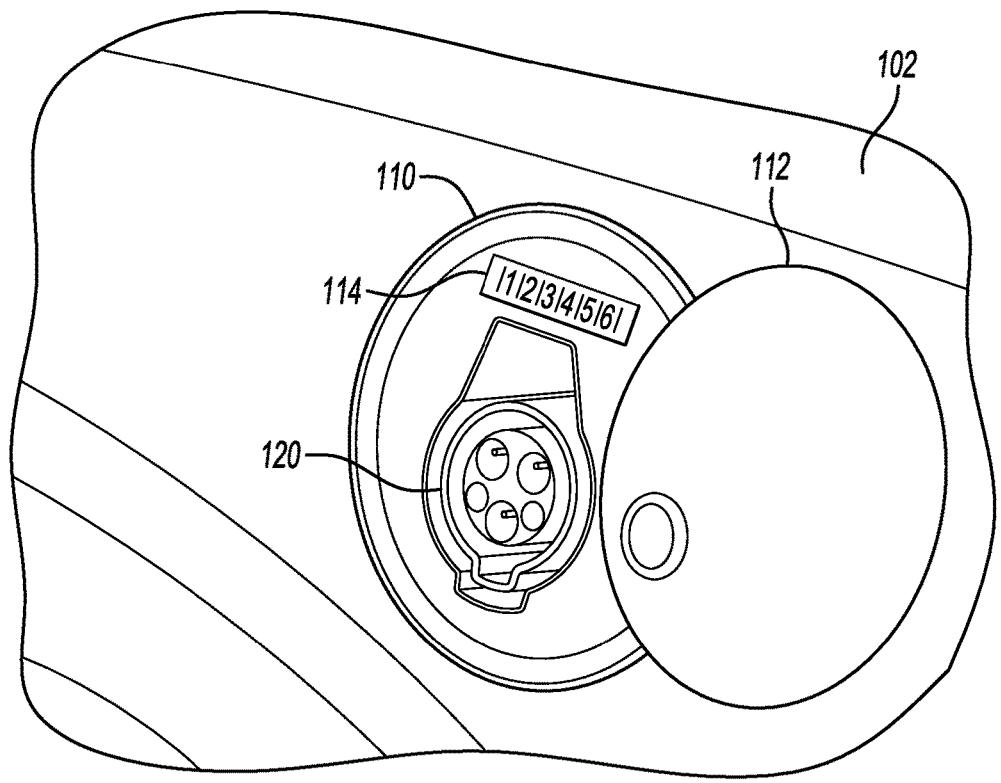
FIG. 5 is a schematic diagram illustrating implementation of a keypad in vicinity of the charge port in accordance with one or more embodiments.

Referring to FIG. 5, a schematic diagram illustrating implementation of the first I/O device (e.g., the first key pad) 114 is shown. The first I/O device 114 is illustrated mounted beside (i.e., proximate to, near, in close vicinity to, nearly adjacent) the charge port 120 beneath the outer surface of the EV 102 and behind the door panel 112 in the closed position, in accordance with one or more embodiments. For clarity, the panel door 112 is illustrated in the open position and provides the user access through the body panel opening 110 to the receptacle 120 and to the key pad 114.

Referring to FIGS. 1-5 collectively, the receptacle 120 is configured to matingly receive the connector 144. Insertion of the nose section 164 of the connector 144 into the receptacle 120 is generally performed by the user (e.g., the step 310 of the method 300), and, under control of the controller 152, generally results in the locking of the connector 144 into the receptacle 120 via the latch arm 166. Insertion of the connector 144 into the receptacle 120 generally provides electrical communication between the charge input module 126, the VCU 130, and charging station 142 (e.g., the controller 152) and completes directly coupled electrical communication through the system 100.

Figure 6:
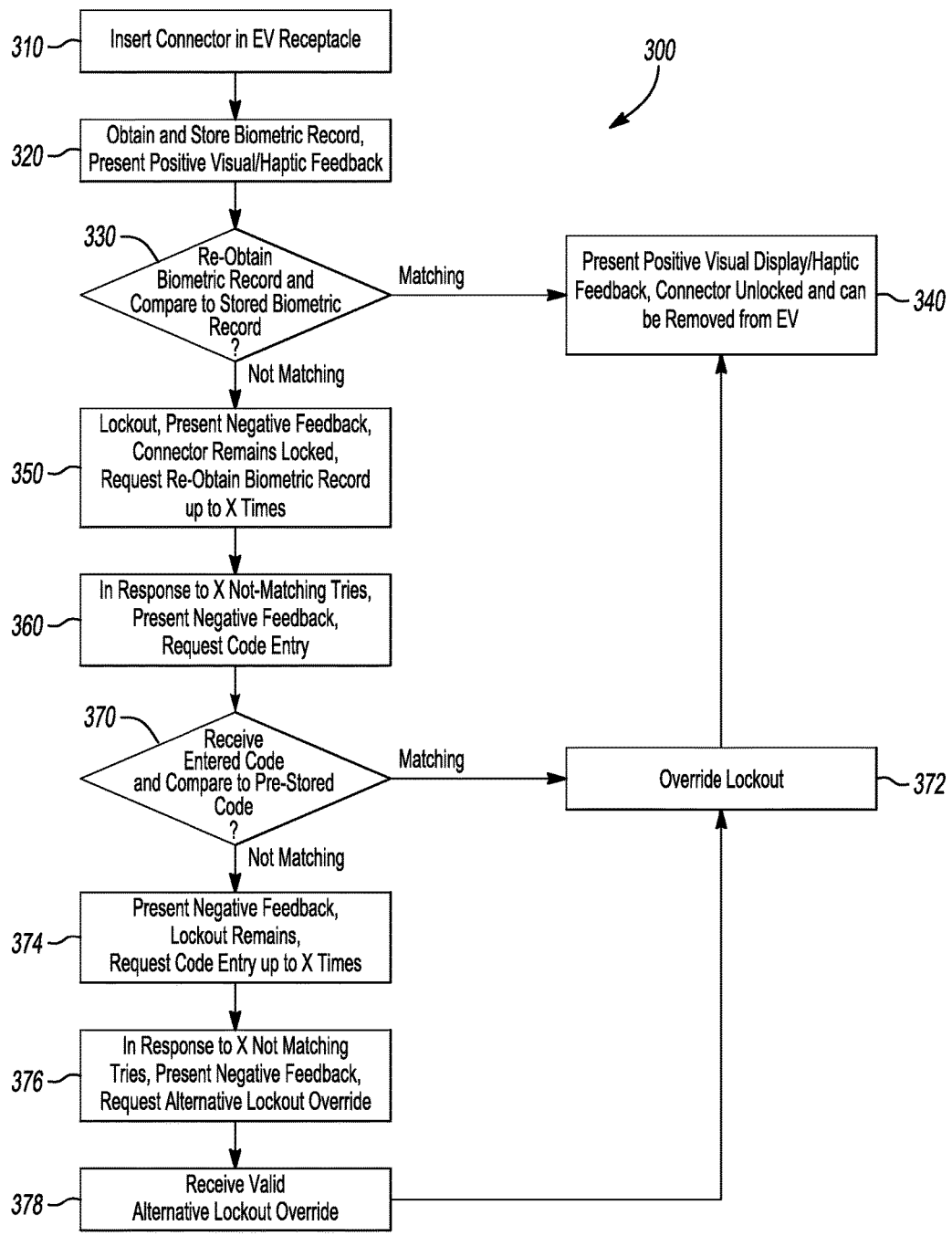
FIG. 6 is a flow diagram illustrating a method of preventing unauthorized disengagement between the electrical plug and the charge port on the electric vehicle in accordance with one or more embodiments.

Referring to FIG. 6, a flow diagram illustrating the soft lock method 300 for preventing unauthorized disengagement between the electrical plug 144 and the charge port 120 on the electric vehicle 102 in accordance with one or more embodiments is shown. The soft lock method 300 generally comprises the steps (e.g., blocks, operations, and the like) 310, 320, 330, 340, 350, 360, 370, 374, 376, and 378 which are generally performed under the control of the controller 152 via software (programming) stored in a non-transitory manner in the memory 154. However, some steps to the method 300 may be performed in accordance with information (e.g., data, records, and the like) that is stored to and retrieved from transitory sections of the memory 154. Further, some steps to the method 300 may be performed in accordance with information (e.g., data, records, and the like) and instructions that are obtained from the user.

Prior to performance of the soft lock method 300, the user will generally have stored in the memory 154, one or more valid codes (e.g., a pre-stored code comprising alphanumeric characters or the like) which may provide an alternative technique to unlock the connector 144 from the receptacle 120, e.g., to override (e.g., disable, deactivate, etc.) a lockout condition (e.g., a condition wherein the soft lock system 100 prevents unlocking the connector 144 from the receptacle 120). Further, embodiments of the soft lock system 100 may implement alternative activities to unlock the connector 144 from the receptacle 120 such as a valid signal presented by an electronic key fob, telephone, testing diagnostics and repair instruments, or the like; or a mechanical key and lock apparatus (e.g., a hard lock).

At a time that the user wishes to recharge the battery 128, the user generally inserts the charging connector 144 into the receptacle 120 (e.g., the step 310). As noted above with regard to FIGS. 1-5, under control of (e.g., in response to programming stored in the memory 154, instructions, and the like) the controller 152, the connector 144 becomes locked into the receptacle 120.

Next, the method 300 transitions to the step 320, and the system 100 obtains, generates, and stores a biometric record (e.g., a stored biometric record, a record of biometric information such as a scan of a fingerprint) from the user. In an embodiment with the second I/O device 174 implemented as combination key/fingerprint scanner/haptic feedback device, the process of obtaining, generating, and storing the stored biometric record from the user is generally conducting via the user pressing a digit (e.g., a finger or thumb) for scanning by the second I/O device 174, and electrically storing the biometric record for later retrieval (e.g., in the memory 154 via the controller 152). The third I/O (visual indicator) device 176 presents a positive visual display (e.g., a continuously lit green light) to the user, and the second I/O device 174 may present a first type of haptic signal (e.g., a continuous vibration (e.g., "buzz")) to the user to indicate that the stored biometric record has been obtained and stored. As would be understood by one of skill in the art, in alternative embodiments, the second I/O device 174 may be implemented as other biometric identification parameter sensors/readers. In such instances, the user would take appropriate action(s) to input the desired information to generate the stored biometric record.

At a time the user wishes to attempt to disengage the connector 144 from the receptacle 120 (e.g., at a time the battery 128 is fully charged, or at a time the user wishes to drive away the EV 102 even though the battery 128 is not fully charged), i.e., the method transitions to the step 330. Under control of the controller 152, in response to the user pressing for scanning on the second I/O device 174 the digit that was previously presented for obtaining and storing the stored biometric record, the second I/O device 174 scans the digit, re-obtains a biometric record (e.g., a re-obtained biometric record); and the controller 152 compares the re-obtained biometric record with the stored biometric record (e.g., as read from the memory 154).

In response to the controller 152 determining the re-obtained biometric record is matching the stored biometric record, under control of the controller 152, the method 300 transitions to the step 340; i.e., the third I/O (visual indicator) device 176 presents the positive visual display to the user, and the connector 144 is unlocked. The second I/O device 174 may also present the first type of haptic signal (e.g., the continuous vibration) to the user. The user generally removes (disengages) the connector 144 from the receptacle 120.

In response to the controller 152 determining the re-obtained biometric record is not matching the stored biometric record, under control of the controller 152, the method 300 transitions to the step 350, i.e., a lockout condition (e.g., state, mode, etc.) is imposed by the system 100. The connector 144 remains locked in the receptacle 120. Further, the system 100 requests (prompts) the user, generally by the third I/O (visual indicator) device 176 presenting a first type of negative visual display (e.g., a continuously lit red light) to the user, to try to provide a re-obtained biometric record matching the stored biometric record for up to X re-obtain tries (i.e., X or fewer tries), where X is generally a number no more than three (3), but may be set by the user to any desired number of attempts. The second I/O device 174 may also present a second type of haptic signal (e.g., a slowly pulsed vibration) to the user.

In response to the controller 152 determining the re-obtained biometric record is not matching the stored biometric record after the X or more re-obtain tries, under control of the 152 controller, the method 300 transitions to the step 360, i.e., the connector 144 remains locked in the receptacle 120, and the system 100 requests that the user, generally by the third I/O (visual indicator) device 176 presenting a second type of negative visual display (e.g., a flashing red light) to the user, to provide (i.e., enter) an entered code (e.g., an entered code matching the pre-stored code that was previously authorized and stored in the memory 154), where entry is generally via either of the first key pad (first I/O) device 114 or the second key pad (fourth I/O) device 178. The second I/O device 174 may also present a third type of haptic signal (e.g., a rapidly pulsed vibration) to the user.

The method 300 transitions to the step 370. Under the control of the controller 152, the system 100 receives the entered code which is compared to the pre-stored code. In response to the controller 152 determining the entered code is matching the pre-stored code, under control of the controller 152, the method 300 transitions to the step 372, i.e., the system 100 overrides the lockout. The method 300 transitions to the step 340, the third I/O (visual indicator) device 176 presents the positive visual display (e.g., a continuously lit green light) to the user to indicate that the connector 144 may be disengaged (removed, unplugged, etc.) from the receptacle 120, and the connector 144 is unlocked. The second I/O device 174 may also present the first type of haptic signal to the user. The user generally removes (disengages) the connector 144 from the receptacle 120.

In response to the controller 152 determining the entered code at the step 370 is not matching the pre-stored code, under control of the controller 152, the method 300 transitions to the step 374, i.e., the lockout condition remains in the system 100. The connector 144 remains locked in the receptacle 120. Further, the system 100 requests (prompts) the user, generally by the third I/O (visual indicator) device 176 presenting the first type of negative visual display (e.g., a continuously lit red light) to the user, to try to provide an entered code matching the pre-stored code for up to X enter tries. The second I/O device 174 may also present the second type of haptic signal (e.g., a slowly pulsed vibration) to the user.

The method 300 transitions to the step 376. In response to the controller 152 determining the entered code is not matching the pre-stored code after the X or more enter tries, under control of the controller 152, the connector 144 remains locked in the receptacle 120, and the system 100 requests that the user, generally by the third I/O (visual indicator) device 176 presenting the second type of negative visual display (e.g., a flashing red light) to the user, to pursue an alternative lockout override. The second I/O device 174 may also present the third type of haptic signal (e.g., a rapidly pulsed vibration) to the user. The alternative lockout override may include an electronic key fob signal, an override command presented via testing and diagnostics devices, a physical key actuated mechanical lock, and the like.

Under control of the controller 152, the method 300 transitions to the step 378. In response to the system 100 receiving the alternative lockout override, under control of the controller 152, the method transitions to the step 372. The controller 152 unlocks the connector 144 and indicates to the user that the alternative override was received and was successful. That is, under control of the controller 152, the third I/O (visual indicator) device 176 presents the positive visual display (e.g., a continuously lit green light) to the user to indicate that the connector 144 may be disengaged (removed, unplugged, etc.) from the receptacle 120. The second I/O device 174 may also present the first type of haptic signal to the user. Otherwise, the system 100 generally remains in the lockout condition, i.e., the connector 144 generally remains locked in the connector 120.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of locking a connector to a receptacle on an electric vehicle (EV), comprising:
    during coupling of the connector to the receptacle by a user,
        the receptacle electrically coupling to a controller, and
        the controller obtaining a biometric record from the user, storing the biometric record in memory as a stored biometric record, and locking the connector into the receptacle, the memory including a pre-stored code stored therein;
    responsive to the user attempting to uncouple the connector, the controller generating a re-obtained biometric record;
    responsive to the re-obtained biometric record matching the stored biometric record, the controller unlocking the connector;
    responsive to the re-obtained biometric record not matching the stored biometric record, the connector remaining locked;
    responsive to the re-obtained biometric record not matching the stored biometric record, the controller indicating to the user that the re-obtained biometric record is not matching the stored biometric record and the controller generating a re-obtained biometric record for up to X re-obtain tries;
    responsive to the re-obtained biometric record matching the stored biometric record, the controller unlocking the connector;
    responsive to the re-obtained biometric record not matching the stored biometric record after X re-obtain tries, the controller indicating to the user that the re-obtained biometric record is not matching the stored biometric record and the connector remaining locked;
    responsive to an entered code matching the pre-stored code, the controller unlocking the connector;
    responsive to the entered code not matching the pre-stored code after X enter tries, the connector remaining locked; and
    responsive to receiving an alternative lockout override, the controller unlocking the connector.

2. The method of claim 1, wherein the connector further comprises
    a housing having a biometric sensor input/haptic feedback output device mounted on top of the housing, in communication with the controller, and configured for obtaining the stored biometric record and the re-obtained biometric record, and for providing haptic feedback to the user;
    a visual indicator mounted on top of the housing, in communication with the controller, and configured for providing visual feedback to the user; and
    a first key pad mounted on a side of the housing, in communication with the controller, and configured for obtaining the entered code from the user.

3. The method of claim 2, the EV further comprising a panel door on an exterior of the EV, the receptacle being mounted on the EV behind the panel door, and a second key pad being in electrical communication with the receptacle and with the controller via an electrical coupling of the connector to the receptacle, and being configured for obtaining the entered code from the user, the second key pad being mounted at a location that is one of (i) in vicinity of the receptacle on an outer surface of the EV, and (ii) adjacent to the receptacle and behind the panel door; and
    a charging station further comprising a third key pad in communication with the controller, and configured for obtaining the entered code from the user.

4. The method of claim 3, wherein
    the controller indicating to the user that the biometric record has been stored by presenting at least one of a positive visual display and a first type of haptic signal;
    the controller indicating to the user that the re-obtained biometric record is matching the stored biometric record by presenting at least one of the positive visual display and the first type of haptic signal;
    the controller indicating to the user that the re-obtained biometric record is not matching the stored biometric record at fewer than X re-obtain tries by presenting at least one of a first type of negative visual display and a second type of haptic signal;
    the controller indicating to the user that the re-obtained biometric record is not matching the stored biometric record after X or more re-obtain tries by presenting at least one of a second type of negative visual display and a third type of haptic signal;
    the controller indicating to the user that the entered code is matching the pre-stored code by presenting at least one of the positive visual display and the first type of haptic signal;
    the controller indicating to the user that the entered code is not matching the pre-stored code at fewer than X enter tries by presenting at least one of the first type of negative visual display and the second type of haptic signal;
    the controller indicating to the user that the entered code is not matching the pre-stored code at X or more enter tries by presenting at least one of the second type of negative visual display and the third type of haptic signal; and
    the controller indicating to the user that the alternate lockout override was received and successful by presenting at least one of the positive visual display and the first type of haptic signal.

5. The method of claim 4, the biometric record comprising at least one of a thumbprint, a fingerprint, a palmprint, a retinal image, a facial image, a voice, and a voice and code words.

6. The method of claim 4, the alternate lockout override comprising at least one of an electronic key fob signal, an override command presented via testing and diagnostics devices, and a physical key actuated mechanical lock.

7. A connector to a lock receptacle, comprising:
    a controller;
    a memory electrically coupled to the controller, wherein during a user coupling the connector to the receptacle, the controller generates and stores a stored record in the memory, during the user attempting uncoupling the connector, the controller generates a re-obtained record, responsive to the re-obtained record matching the stored record, the controller unlocks the connector, the controller is programmed to control the receptacle in response to programming stored in the memory and information received from the user, the connector is configured to matingly couple and lock to the receptacle, during the user coupling the connector to the receptacle, the receptacle is electrically coupled to the controller and the controller locks the connector into the receptacle, the stored record is a stored biometric record and the re-obtained record is a re-obtained biometric record, and the memory includes a pre-stored code stored therein, and wherein responsive to the controller determining the re-obtained biometric record is not matching the stored biometric record, the connector remains locked, responsive to the re-obtained biometric record not matching the stored biometric record, the controller indicates to the user that the re-obtained biometric record is not matching the stored biometric record and the controller generates a re-obtained biometric record for up to X re-obtain tries, responsive to the re-obtained biometric record matching the stored biometric record, the controller unlocks the connector, responsive to the re-obtained biometric record not matching the stored biometric record after X re-obtain tries, the controller indicates to the user that the re-obtained biometric record is not matching the stored biometric record, and the connector remains locked, responsive to an entered code matching the pre-stored code, the controller unlocks the connector, responsive to the entered code not matching the pre-stored coded after X enter tries, the connector remains locked, and responsive to receiving an alternative lockout override, the controller unlocks the connector.

8. The connector of claim 7, wherein
the receptacle is mounted on an electric vehicle (EV);
the controller is a component of a charging station;
the controller is programmed to control the receptacle in response to programming stored in the memory and information received from the user;
a cable is electrically coupled to the controller and terminated with the connector, and
the connector is configured to matingly couple and lock to the receptacle;
wherein, during the user coupling the connector to the receptacle, the receptacle is electrically coupled to the controller, and the controller locks the connector into the receptacle;
the stored record is a stored biometric record and the re-obtained record is a re-obtained biometric record; and
responsive to the controller determining the re-obtained biometric record is not matching the stored biometric record, the connector remains locked.

9. The connector of claim 8, wherein the memory includes a pre-stored code stored therein;
responsive to the re-obtained biometric record not matching the stored biometric record, the controller indicates to the user that the re-obtained biometric record is not matching the stored biometric record, and the controller generates a re-obtained biometric record for up to X re-obtain tries;

responsive to the re-obtained biometric record matching the stored biometric record, the controller unlocks the connector;

responsive to the re-obtained biometric record not matching the stored biometric record after X re-obtain tries, the controller indicates to the user that the re-obtained biometric record is not matching the stored biometric record, and the connector remains locked;

the controller requests the user provide an entered code, and compares the entered code with the pre-stored code for up to X enter tries;

responsive to the entered code matching the pre-stored code, the controller unlocks the connector;

responsive to the entered code not matching the pre-stored code after X enter tries, the connector remains locked;

the controller requests the user to perform an alternative lockout override; and responsive to receiving the alternative lockout override, the controller unlocks the connector.

10. The connector of claim 7, wherein the connector further comprises a housing having a biometric sensor input/haptic feedback output device mounted on top of the housing, is in communication with the controller, and is configured to obtain the stored biometric record and the re-obtained biometric record, and to provide haptic feedback to the user;

a visual indicator is mounted on top of the housing, is in communication with the controller, and is configured to provide visual feedback to the user; and a first key pad is mounted on a side of the housing, is in communication with the controller, and is configured to obtain the entered code from the user.

11. The connector of claim 10, wherein
the controller indicates to the user that the stored biometric record has been stored by presenting at least one of a positive visual display and a first type of haptic signal;

the controller indicates to the user that the re-obtained biometric record is matching the stored biometric record by presenting at least one of the positive visual display and the first type of haptic signal;

the controller indicates to the user that the re-obtained biometric record is not matching the stored biometric record at fewer than X re-obtain tries by presenting at least one of a first type of negative visual display and a second type of haptic signal;

the controller indicates to the user that the re-obtained biometric record is not matching the stored biometric record after X or more re-obtain tries by presenting at least one of a second type of negative visual display and a third type of haptic signal;

the controller indicates to the user that the entered code is matching the pre-stored code by presenting at least one of the positive visual display and the first type of haptic signal;

the controller indicates to the user that the entered code is not matching the pre-stored code at fewer than X enter tries by presenting at least one of the first type of negative visual display and the second type of haptic signal;

the controller indicates to the user that the entered code is not matching the pre-stored code at X or more enter tries by presenting at least one of the second type of negative visual display and the third type of haptic signal; and the controller indicates to the user that the alternate lockout override was received and successful by presenting at least one of the positive visual display and the first type of haptic signal.

12. A lock system for securing a charging connector to an electric vehicle (EV), comprising:
a charging station including a controller electrically coupled to a memory including a pre-stored code stored therein, and programmed to control the system responsive to programming stored in the memory and information received from a user;
a cable electrically coupled to the controller and terminated with the connector; and
a receptacle on the EV, wherein the connector is configured to matingly couple and lock to the receptacle, wherein during user coupling, the connector to the receptacle is electrically coupled to the controller, the controller obtains a biometric record from the user and stores the biometric record in the memory as a stored biometric record, and locks the connector into the receptacle, and wherein
responsive to the user attempting uncoupling the connector, the controller generates a re-obtained biometric record,
responsive to the re-obtained biometric record matching the stored biometric record, the controller unlocks the connector,
responsive to the re-obtained biometric record not matching the stored biometric record, the connector remains locked,
responsive to the re-obtained biometric record not matching the stored biometric record, the controller indicates to the user that the re-obtained biometric record is not matching the stored biometric record and the controller generates a re-obtained biometric record for up to X re-obtain tries,
responsive to the re-obtained biometric record matching the stored biometric record, the controller unlocks the connector,
responsive to the re-obtained biometric record not matching the stored biometric record alter X re-obtain tries, the controller indicates to the user that the re-obtained biometric record is not matching the stored biometric record and the connector remains locked,
responsive to an entered code matching the pre-stored code, the controller unlocks the connector,
responsive to the entered code not matching the pre-stored code after X enter tries, the connector remains locked, and
responsive to receiving an alternative lockout override, the controller unlocks the connector.

13. The system of claim 12, wherein
the connector further comprises a housing having a biometric sensor input/haptic feedback output device mounted on top of the housing and in communication with the controller, and configured to obtain the stored biometric record and the re-obtained biometric record, and to provide haptic feedback to the user,
a visual indicator is mounted on top of the housing, is in communication with the controller, and is configured to provide visual feedback to the user, and
a first key pad is mounted on a side of the housing, is in communication with the controller, and is configured to obtain the entered code from the user.

14. The system of claim 13, wherein the EV further comprises a panel door on an exterior of the EV and the receptacle is mounted on the EV behind the panel door, and a second key pad in electrical communication with the receptacle and with the controller via an electrical coupling of the connector to the receptacle, and configured to obtain the entered code from the user, and the second key pad is mounted at a location that is one of (i) in vicinity of the receptacle on an outer surface of the EV, and (ii) adjacent to the receptacle and behind the panel door; and
the charging station further comprises a third key pad in communication with the controller, and configured to obtain the entered code from the user.

15. The system of claim 14, wherein
the controller indicates to the user that the biometric record has been stored by presenting at least one of a positive visual display and a first type of haptic signal,
the controller indicates to the user that the re-obtained biometric record is matching the stored biometric record by presenting at least one of the positive visual display and the first type of haptic signal,
the controller indicates to the user that the re-obtained biometric record is not matching the stored biometric record at fewer than X re-obtain tries by presenting at least one of a first type of negative visual display and a second type of haptic signal,
the controller indicates to the user that the re-obtained biometric record is not matching the stored biometric record after X or more re-obtain tries by presenting at least one of a second type of negative visual display and a third type of haptic signal,
the controller indicates to the user that the entered code is matching the pre-stored code by presenting at least one of the positive visual display and the first type of haptic signal,
the controller indicates to the user that the entered code is not matching the pre-stored code at fewer than X enter tries by presenting at least one of the first type of negative visual display and the second type of haptic signal,
the controller indicates to the user that the entered code is not matching the pre-stored code at X or more enter tries by presenting at least one of the second type of negative visual display and the third type of haptic signal, and
the controller indicates to the user that the alternate lockout override was received and successful by presenting at least one of the positive visual display and the first type of haptic signal.

16. The system of claim 15, wherein the biometric record comprises at least one of a thumbprint, a fingerprint, a palmprint, a retinal image, a facial image, a voice, and a voice and code words.

17. The system of claim 15, wherein the alternate lockout override comprises at least one of an electronic key fob signal, an override command presented via testing and diagnostics devices, and a physical key actuated mechanical lock.

* * * * *